UNITED STATES PATENT OFFICE.

EDUARD RUDOLF KOBERT, OF DORPAT, RUSSIA.

MEDICINAL PREPARATION FROM BLOOD.

SPECIFICATION forming part of Letters Patent No. 541,933, dated July 2, 1895.

Application filed February 13, 1892. Serial No. 421,445. (Specimens.)

*To all whom it may concern:*

Be it known that I, EDUARD RUDOLF KOBERT, a subject of the Emperor of Germany, residing at Dorpat, Russia, have invented an Improved Medicinal Preparation and Method of Producing the Same, of which the following is a specification.

My invention consists of an improved medicinal preparation or blood-forming tonic and method of making the same. This is a preparation obtained by the treatment of blood, and its characteristics are such that it is especially well adapted for reabsorption by the patient, through the intestinal canal, of the iron contained in the preparation.

I obtain the preparation from blood by properly treating the latter with suitable reducing or deoxidizing agents. Fresh defibrinated blood is subjected to the action of the reducing or deoxidizing agents with the result that a precipitate is obtained and separated from the fluid or other substances, which may be present. This precipitate contains about 47.5 per cent. of carbon, about 8.1 per cent. of hydrogen, about twelve per cent. of nitrogen, and up to or less than one per cent. of iron. This iron preparation may be obtained according to the present invention by the special process hereinafter described, for which process a reducing or deoxidizing agent, especially such as zinc or iron, is employed, which introduces foreign solid substances into the precipitate. Such process is characterized by the use of a suitable solvent of the iron preparation, such as a saturated aqueous solution of ammonium carbonate, for separating the desired preparation from the precipitate obtained by such reducing or deoxidizing agent. Accordingly, the process may be performed as follows: Defibrinated fresh blood suitably diluted with water is shaken with a reducing or deoxidizing agent, such as zinc (zinc dust) or iron, which introduces foreign solid substances into the mixture and the resulting brown precipitate is introduced, after the washing of the same, into a preferably saturated solution of ammonium carbonate or brought together with the same and then well triturated with such solution. The iron preparation which has passed into the precipitate is at once dissolved, forming a beautiful red liquid. This red solution is then separated from the undissolved residue. Such separated liquid is preferably diluted with water and then neutralized with a suitable acid, such as highly diluted hydrochloric acid. After the escape of the carbonic acid the iron preparation is obtained by itself as a red brown or black brown precipitate, which, for the purpose of removing the sal ammoniac produced, is washed out with water and then dried. The drying may take place over sulfuric acid and calcium chlorid.

The iron preparation of the present invention derived from blood forms a red brown to black brown powder and contains (as above stated) about 47.5 per cent. of carbon, about 8.1 per cent. of hydrogen, and about twelve per cent. of nitrogen, and up to or less than one per cent. of iron. The same is practically insoluble in water and differs very materially, not only from hæmoglobin and methæmoglobin, which contain from fifty-three to fifty-four per cent. of carbon, but also from hæmatin with about 8.8 per cent. of iron and as much nitrogen. It also differs from other iron preparations, such as iron albuminates, iron peptonates and from the ordinary hæmoglobin preparations by its greater capacity for utilization of the iron it contains, and by the greater digestibility with less effort of the digestive organs, because it has already undergone the reducing or deoxidizing process which the said preparations have to undergo in the intestinal canal owing to the action of the reducing or deoxidizing intestinal bacteria, which are always present. An intimate mixture of hæmoglobin with water shows in the spectrum the absorption bands of hæmoglobin between the lines D and E, while an intimate mixture of water with the product obtained as above described does not show such absorption bands between the spectrum lines D and E. Furthermore, hæmoglobin and hæmatin possess a disagreeable taste, while the product obtained according to the present invention is practically without taste.

What I claim as my invention, and desire to secure by Letters Patent, is—

1. A blood forming iron preparation derived from blood, consisting of a red brown to black brown powder readily absorbable by the digestive organs, and practically insoluble in water, having a less percentage of carbon than hæmoglobin or oxyhæmoglobin, the intimate mixture of such preparation with water not producing the absorption bands of hæmoglobin between the spectrum lines D and E, substantially as described.

2. The method of obtaining blood-forming iron preparations derived from blood, which consists in precipitating such substances out of blood by the action of a reducing agent which introduces into the precipitate foreign solid matters, separating the precipitate from the liquid and treating this precipitate with a solvent of the said iron preparation, such as with an aqueous solution of ammonium carbonate, thereby separating the iron preparations from the foreign solid matters, substantially as described.

3. The method of obtaining blood-forming iron preparations derived from blood, which consists in precipitating such substances out of blood by the action of a reducing agent which introduces into the precipitate foreign solid matters, separating the precipitate from the liquid and treating this precipitate with a solvent of the said iron-preparation, such as an aqueous solution of ammonium carbonate, thereby separating the iron-preparations from the foreign solid matters, precipitating the dissolved iron-preparation from the resulting solution preferably by neutralizing by means of an acid, and finally separating the precipitate, substantially as described.

In testimony whereof I have signed my name to this specification in the presence of two subscribing witnesses.

EDUARD RUDOLF KOBERT.

Witnesses:
T. URKE,
W. FRISK.